(12) United States Patent
Usov et al.

(10) Patent No.: US 7,849,514 B2
(45) Date of Patent: Dec. 7, 2010

(54) TRANSPARENT ENCRYPTION AND ACCESS CONTROL FOR MASS-STORAGE DEVICES

(75) Inventors: Viacheslav Usov, Strassen (LU); Andrey Kolishchak, Luxembourg (LU)

(73) Assignee: Lumension Security, Inc., Scottsdale, AZ (US)

( * ) Notice: Subject to any disclaimer, the term of this patent is extended or adjusted under 35 U.S.C. 154(b) by 1472 days.

(21) Appl. No.: 11/111,930

(22) Filed: Apr. 22, 2005

(65) Prior Publication Data

US 2005/0246778 A1 Nov. 3, 2005

Related U.S. Application Data

(60) Provisional application No. 60/564,579, filed on Apr. 23, 2004.

(51) Int. Cl.
*H04K 1/00* (2006.01)

(52) U.S. Cl. .......................... 726/28; 380/45; 380/277; 713/165; 726/3

(58) Field of Classification Search ............. 380/28–30, 380/44–47, 259, 277–286; 709/225, 229; 713/165, 167–174, 182–186; 726/2–8
See application file for complete search history.

(56) References Cited

U.S. PATENT DOCUMENTS

| | | | |
|---|---|---|---|
| 5,794,049 A | 8/1998 | Lindholm | 717/136 |
| 5,826,088 A | 10/1998 | Sitbon et al. | 717/139 |
| 5,854,930 A | 12/1998 | McLain et al. | 717/139 |
| 5,923,878 A | 7/1999 | Marsland | 717/139 |
| 5,953,422 A * | 9/1999 | Angelo et al. | 713/185 |
| 6,038,394 A | 3/2000 | Layes et al. | 717/139 |

(Continued)

FOREIGN PATENT DOCUMENTS

WO WO98/50843 11/1998

(Continued)

OTHER PUBLICATIONS

Hawkins, W., *LIMP: An Interpreted Programming Language for Students, Professors and Programmers*, Consortium for Computing Sciences in Colleges: Southeastern Conference, JCSC, vol. 19, No. 3, pp. 96-109 (Jan. 2004).

(Continued)

*Primary Examiner*—Kimyen Vu
*Assistant Examiner*—Darren Schwartz
(74) *Attorney, Agent, or Firm*—Greenberg Traurig, LLP

(57) ABSTRACT

A system and method for securing data on a mass storage device. A centralized device permission store contains device identifiers for the mass storage devices to be secured along with keys of a symmetric cipher that have been encrypted with public keys or pass phrases of authorized users of the devices. A list of these users also contained in the store. A helper module provides the private key or pass phrase, for imported keys, needed to decrypt the key of the symmetric cipher, which is used to encrypt and decrypt blocks of data stored on the mass storage device. When a read request is made, a protection module intercepts the request, obtains the block from the mass storage device and decrypts the block. When a write request is made, the protection module intercepts the request, encrypts the block and has it stored on the mass storage device.

13 Claims, 9 Drawing Sheets

U.S. PATENT DOCUMENTS

| | | | |
|---|---|---|---|
| 6,094,528 A | 7/2000 | Jordan | 717/115 |
| 6,141,793 A | 10/2000 | Bryant et al. | 717/115 |
| 6,367,012 B1 | 4/2002 | Atkinson et al. | 713/176 |
| 6,473,893 B1 | 10/2002 | Kay et al. | 717/116 |
| 6,633,871 B1* | 10/2003 | Jeyachandran et al. | 707/9 |
| 6,721,941 B1 | 4/2004 | Morshed et al. | 717/127 |
| 6,766,454 B1 | 7/2004 | Riggins | 713/185 |
| 6,996,814 B2 | 2/2006 | Bak | 717/148 |
| 2001/0051930 A1 | 12/2001 | Nakamura | |
| 2002/0026427 A1* | 2/2002 | Kon et al. | 705/67 |
| 2002/0029176 A1* | 3/2002 | Carlson et al. | 705/28 |
| 2002/0091186 A1 | 7/2002 | Auerbach | |
| 2002/0099952 A1 | 7/2002 | Lambert et al. | 726/27 |
| 2002/0178370 A1* | 11/2002 | Gurevich et al. | 713/189 |
| 2002/0194209 A1* | 12/2002 | Bolosky et al. | 707/205 |
| 2003/0070083 A1 | 4/2003 | Nessler | |
| 2003/0074564 A1* | 4/2003 | Peterson | 713/182 |
| 2003/0084307 A1* | 5/2003 | Schwartz | 713/189 |
| 2003/0204842 A1 | 10/2003 | Chenelle et al. | 717/177 |
| 2004/0146164 A1* | 7/2004 | Jonas et al. | 380/284 |
| 2005/0091491 A1* | 4/2005 | Lee et al. | 713/167 |
| 2005/0125684 A1* | 6/2005 | Schmidt | 713/200 |

FOREIGN PATENT DOCUMENTS

| | | |
|---|---|---|
| WO | WO01/98876 | 12/2001 |
| WO | WO2005/099342 | 10/2005 |

OTHER PUBLICATIONS

Karinthi, et al., *Incremental Re-Execution of Programs*, ACM, pp. 38-44 (1987).

Kc, et al., *Countering Code-Injection Attacks With Instruction-Set Randomization*, ACM, pp. 272-280 (2003).

Milanés, et al., *Managing Jobs With an Interpreted Language for Dynamic Adaptation*, ACM, pp. 1-6 (2005).

International Search Report and Written Opinion of the International Searching Authority in related PCT application PCT/IB05/001623, pp. 1-10 (Oct. 25, 2006).

International Search Report and Written Opinion of the International Searching Authority in related PCT application PCT/IB05/002335, pp. 1-10 (Feb. 8, 2006).

International Search Report dated Feb. 23, 2006 (Eight (8) pages).

* cited by examiner

TRANSPARENT ENCRYPTION AND ACCESS CONTROL FOR MASS-STORAGE DEVICES

CROSS-REFERENCE TO RELATED APPLICATIONS

This application is related to U.S. Provisional Application, Ser. No. 60/562,983, filed Apr. 19, 2004, and titled "A GENERIC FRAMEWORK FOR RUNTIME INTERCEPTION AND EXECUTION CONTROL OF INTERPRETED LANGUAGES", which application incorporated by reference into the instant application.

This application is related to U.S. Provisional Application Ser. No. 60/562,982, filed Apr. 19, 2004, and titled "ONLINE CENTRALIZED AND LOCAL AUTHORIZATION OF EXECUTABLE FILES", which application is incorporated by reference into the instant application.

This application is related to and claims priority to U.S. Provisional Application Ser. No. 60/564,579, filed Apr. 23, 2004, titled "TRANSPARENT ENCRYPTION AND ACCESS CONTROL FOR MASS STORAGE DEVICES", which application is incorporated by reference into the instant application.

FIELD OF THE INVENTION

The present invention relates generally to methods of securing mass-storage devices and more particularly to securing such devices by means of public and private cryptographic systems.

DESCRIPTION OF THE RELATED ART

Cryptographic digests, public and symmetric key cryptography, and digital certificates are used extensively to encrypt and secure mass-storage devices, as well as to secure the communication links between the protection module, the device permission store and the authorization agent. A number of algorithms (SHA-1 for digests and certificates, RSA public key cryptography for certificates and secure communications, AES for secure communications) are in public domain and are employed by the system.

Encryption and access control are applied at the file or directory level in the prior art. The shortcomings are:
 a. This type of control is too heavy-weight (for devices with small capacity or low performance) or generally incompatible (with hot-plug devices in particular).
 b. Such control is not platform independent.
 c. Encryption may often be disabled by users.
 d. Encryption keys are stored with the protected data (even though in an encrypted form).

Certain prior art mass-storage devices have built-in identification or cryptographic functions. The shortcomings are:
 a. Such mass storage devices are model (device) specific.
 b. The cryptographic hardware employed by these devices has poor performance and is generally inflexible (i.e., an encryption algorithm cannot be changed).

Some prior art systems employ rudimentary device-level access control only when a protection module is present, and the "protected" devices are not protected at all without a protection module. Other systems employ obfuscation techniques to protect devices when a protection module is not present. Such techniques are not really secure. Finally, some systems employ cryptographic protection, but either use one encryption key, which compromises the entire system if one device is compromised, or use per-device encryption keys in an insecure way. Some systems only identify mass-storage devices; this identification is either weak (not linked to the data actually stored on the device) or is too expensive (such as a cryptographic digest of an entire or partial set of data).

BRIEF SUMMARY OF THE INVENTION

The invention adds a layer of security to contemporary mass-storage devices (disks, removable drives) and extends the security framework of the contemporary computer operating systems. It is particularly significant for removable (portable) mass-storage devices of moderate capacity (tens or hundreds of megabytes). It relies on the operating system to provide system services for block-level ("raw") access to mass-storage devices.

One embodiment of the present invention is a method of securing data on a mass storage device. The method includes the steps of (i) obtaining permission for a specified access by a current user to a mass storage device, where the mass storage device has one or more blocks of data of a known size stored thereon, and each block of data is encrypted with a symmetric cipher that preserves the size of the block, (ii) if permission is obtained, obtaining the encrypted key of the symmetric cipher used for encrypting the blocks on the mass storage device, (iii) obtaining the private key or pass phrase for decrypting the encrypted key of the symmetric cipher, (iv) decrypting the encrypted key using the private key or pass phrase to obtain the key for the symmetric cipher, and (v) performing a block operation on the mass storage device with the symmetric cipher.

Another embodiment of the present invention is a system for securing data on a mass storage device. The system includes a centralized device permission store, an authorization agent, a helper module, and a protection module. The centralized device permission store is configured to store device identifiers of mass storage devices and publicly encrypted keys of a symmetric cipher associated with devices identified by the identifiers, and a list of users authorized to use a device identified by an identifier. The authorization agent is in operative communication with the centralized device permission store, and is configured to initialize new mass storage devices and register them with the device permission store, to generate device identifiers and publicly encrypted keys of a symmetric cipher, and to view and modify lists of users authorized to use protected devices. The helper module is configured to obtain a private key of an authorized user, where the private key is used in decrypting the publicly encrypted key of a symmetric cipher, and to obtain a user pass phrase for use in decrypting an imported encrypted key of a symmetric cipher, and to import an encrypted key of a symmetric cipher, if it is supplied as a file. The protection module is in operative communication with the centralized device permission store and the helper module, and is configured intercept a block to be written to a mass storage device to encrypt the block using a symmetric cipher and to intercept a block read from the mass storage device to decrypt the block using a symmetric cipher, where the symmetric cipher preserves the size of data blocks on the mass storage device.

ADVANTAGES OF THE PRESENT INVENTION

No system is known to have all of the following properties:
 a. If a device is lost, unauthorized access is prevented.
 b. If the device is lost and its encrypted symmetric key is lost as well (a portable computer with the device attached), unauthorized access is prevented.
 c. Unauthorized access is only possible when both the encrypted symmetric key (stored securely at the local device permission cache, which can be disabled) and an authorized user's private key are compromised (the latter is possible only with the cooperation of the user or malicious code executed in the user's context; in both cases, the data are already compromised).

d. Device protection information is not kept on the device (except in certain import/export scenarios), which is both more secure and flexible, as device permissions may be modified by system administrators without actually accessing the device; this also leaves the entire capacity of the device for user data, which is important for removable devices.

e. Identification is tamper-proof and not computationally expensive.

f. Mass-storage devices are identified in platform-independent and device-independent way. Because the identification information is linked to the encryption key of a device, the identification information cannot be tampered with without rendering the device inaccessible.

g. In particular, the file system may be simplistic and not support file encryption, yet the data is secure (complex file systems may be too heavy-weight or otherwise incompatible with many removable devices). Likewise, a protected device need not provide any special identification or cryptographic functionality.

h. Data encryption is enforced regardless of the user will and may be implemented as an organization-wide policy. When file systems support file encryption, protection may often be disabled by the users.

i. Device permissions are absolute and are enforced even when no protection module is present, because data can only be decrypted with the symmetric key, which is never communicated to the user even in an encrypted form, and even if the device is lost together with a computer that has the encrypted symmetric key for the device (in the cached device protection information), a private key of an authorized user is still necessary.

j. Device encryption keys are device-specific, so even if one is compromised, the other protected devices remain secured.

k. Protection may be implemented transparently, without delegating the task of managing encryption keys or passwords to the end-users.

l. If desired, select users may exchange encryption keys with third parties, with a high degree of control over "import" and "export" operations. This allows two or more organizations to exchange data on encrypted media in a secure way.

m. Device exchange between two or more organizations may also be supported centrally, by importing or exporting encryption keys to and from the centralized device permissions store by designated system administrators.

The present invention works with every file system, and even without file systems (in the "raw" mode), and with every mass-storage device. The present invention is platform independent. Encryption cannot be disabled except by reinitializing the device. Also, in the present invention, encryption keys are not stored with the data and not communicated to users, except in certain optional import/export scenarios when the latter are allowed by system policies. The present invention is limited in performance only by the processing power of the CPUs or specialized cryptographic hardware and is very flexible.

OBJECTS OF THE INVENTION

The objects of invention include but are not limited to:
1. Identifying mass-storage devices in order to enable per-user access control on computers participating in the protection scheme;
2. Preventing unauthorized access to the protected mass-storage devices, even on computers not participating in the protection scheme;
3. Limiting the scope of security breaches when a protected device is lost together with its encryption keys (other devices must remain protected);
4. Protecting mass-storage devices in a platform independent way, compatible with all device partition schemes and file systems; and
5. Protecting mass-storage devices, without requiring any cryptographic support by the device.

BRIEF DESCRIPTION OF THE DRAWINGS

These and other features, aspects and advantages of the present invention will become better understood with regard to the following description, appended claims, and accompanying drawings where:

DETAILED DESCRIPTION OF THE INVENTION

Figure 1A:
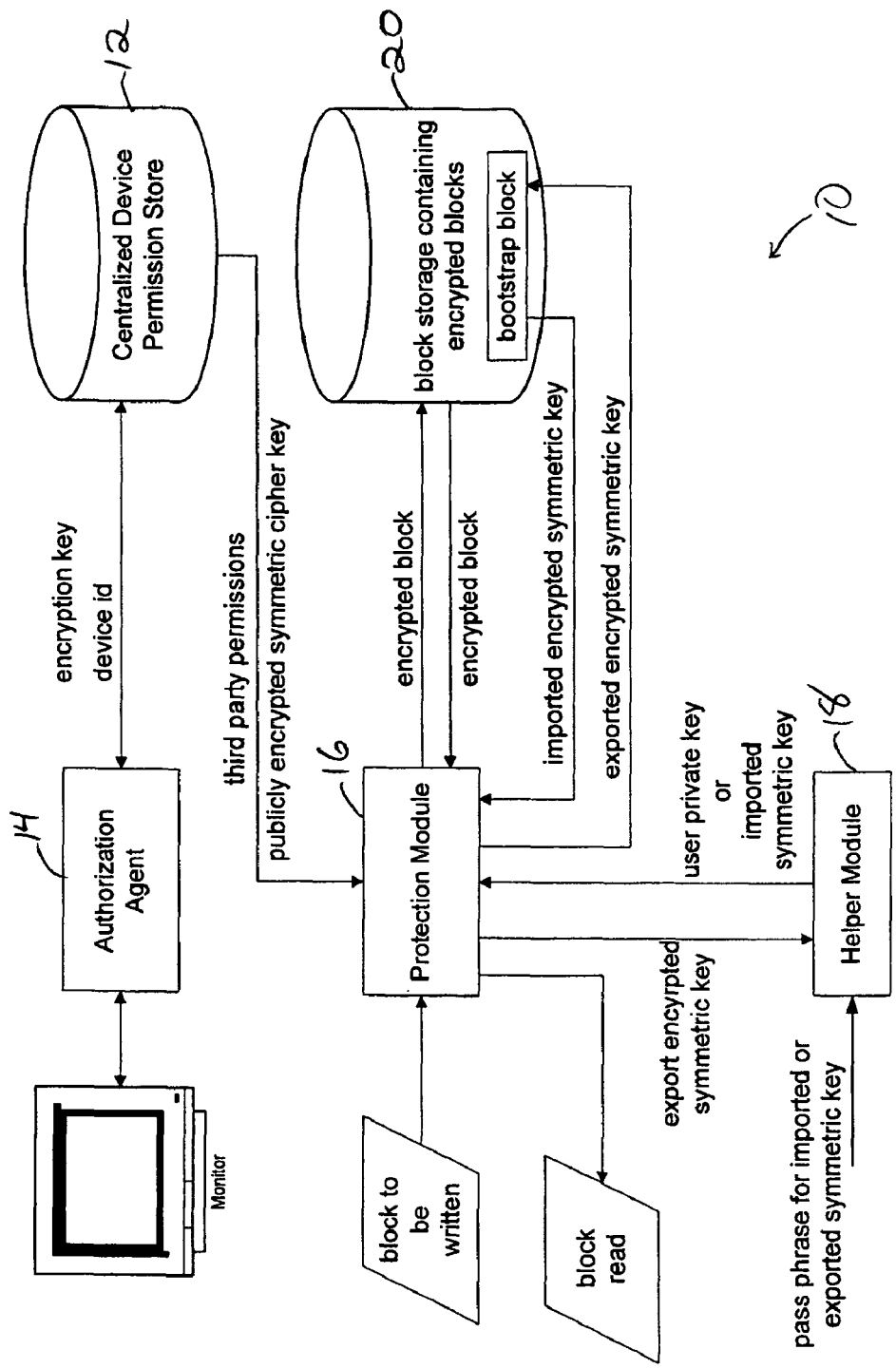
FIG. 1A is a system diagram of the present invention.
Figure 1B:
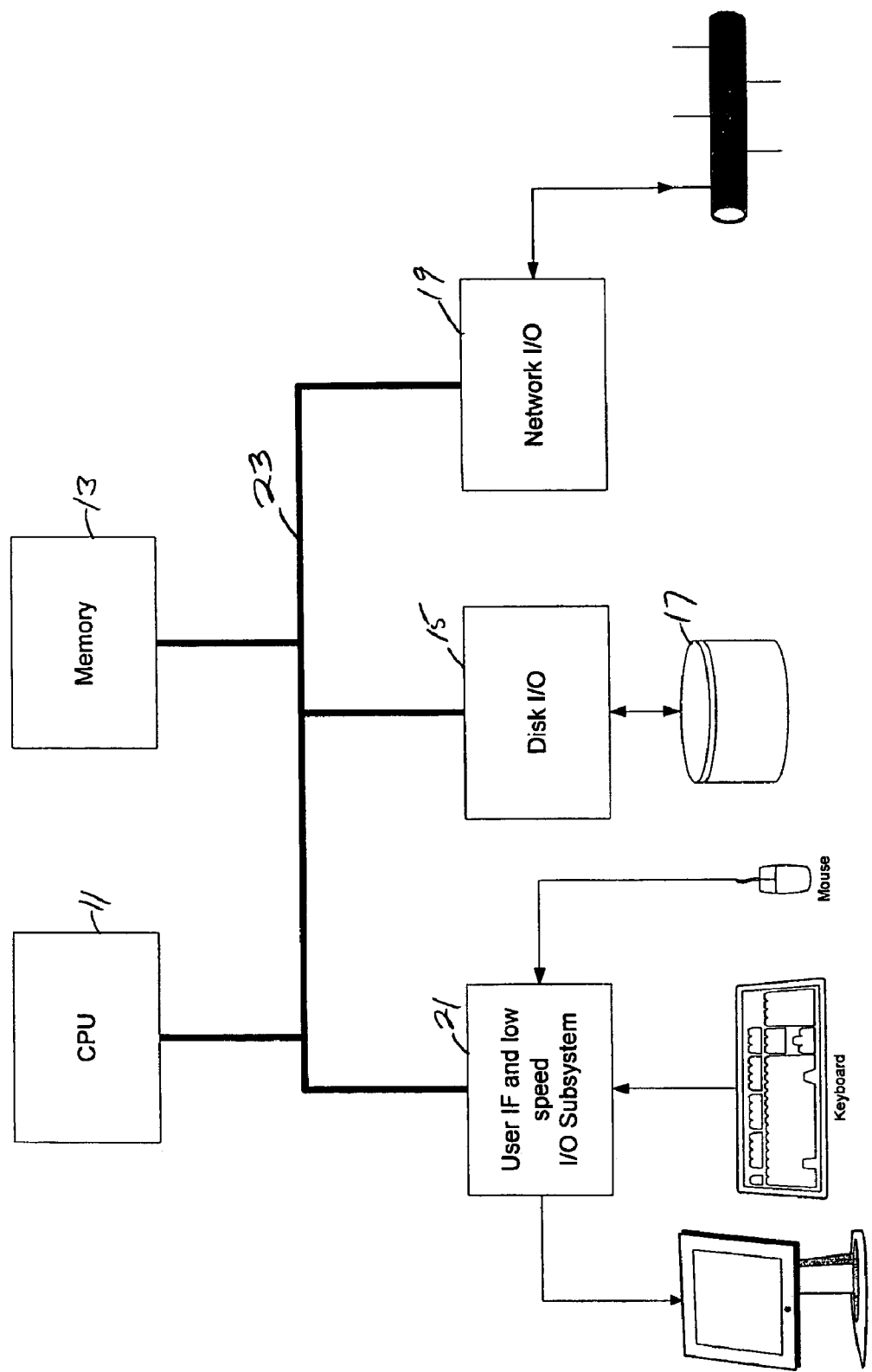
FIG. 1B is a typical computer system.

Referring to FIG. 1A, the system 10 shows four standalone software components are used: a centralized device permission store 12, an authorization agent 14, a protection module 16, and a helper module 18. The software components execute on an exemplary computer system, shown in FIG. 1B, that includes a processor 11, a memory 13, a mass storage subsystem 15, 17, a network subsystem 19, and user-oriented I/O 21, interconnected by a bus 23. The memory 13 and/or mass storage system 15, 17 store the instructions of the software components used for execution by the processor 11.

The centralized device permission store 12 stores device identifiers together with their symmetric encryption keys, as well as a list of users authorized to use a device 20. The device permission store 12 communicates with a device authorization agent 14, which generates device identifiers and encryption keys, as well as authorizes users to use devices. It also communicates with a protection module 16 (by sending it device protection information).

Alternatively, certain users, if allowed by system administrators, may be allowed to import encryption keys provided by third parties. When such a user possesses an encrypted storage device whose device id is not registered in the centralized device permissions store 12 (such a device can be given to the user by another organization, as a means of secure data exchange), the user may instruct the protection module 16 to load a specified encryption key (which is protected with a pass phrase). This encryption key is only used for the duration of the data access; it is not kept persistently by the protection module 16 and is not forwarded to the centralized device permission store 12. The encryption key can be communicated to such a user as a separate file or it may be stored in the bootstrap block of the device. In both cases, it may be encrypted with a pass phrase communicated to the users via a secure medium. Additionally, administrators may import keys to the centralized device permissions store.

A complementary function of exporting an encryption key may also be available to select users and system administrators. Encryption keys may be exported either by means of a separate file or via a bootstrap block of a device, if allowed by system policy. Administrators may export keys from the centralized device permission store, without physical possession of a device. A user must always have a device to export (if allowed). In all cases, a system policy defines the particular keys (i.e., particular devices) that can be exported, who is permitted to do the exporting, the particular form (to a file or the device itself), and the pass phrase strength.

The authorization agent 14 is a set of instruments that the system administrators use to view and modify the lists of users authorized to use protected devices 20, as well as initialize new devices and register them with the device permission store 12. The authorization agent is also responsible for the import and export of encryption keys (admin-level) and for managing import and export permissions.

The protection module 16 is a highly privileged module installed at the computers being protected, which intercepts the services that the operating system provides for block-level access to mass-storage devices.

The helper module 18 supplies the private key to the protection module. The helper module 18 is also responsible for the import and export of encryption keys (user-level, if configured).

Device identification information is stored in the area reserved for the bootstrap loader code in a protected partition. Most removable devices contain only one partition, thus the partition may be identified with the device. Since most removable devices cannot be used as boot devices (because they require extended OS support), no functionality is lost. A protected device that must be bootable must contain a special boot partition. The device identification information contains a unique identifier and auxiliary data that describe the type of the encryption applied to the device, as well as other options. The device id data structure includes the following fields, (i) a "magic" signature to facilitate quick rejection of un-encrypted media, (ii) a version number for the data structure, (iii) an options field (one option is the presence of an encrypted symmetric key (for import), (iv) the type of cipher used to encrypt data (for example AES), (v) length of the data block, (vi) length of the encryption key, (vii) device ID, (viii) symmetric key encrypted with pass phrase (if present, see options), and (ix) SHA-1 digest of the symmetric key (if present, see options).

Each block (except the bootstrap block) of the device is encrypted with a symmetric cipher, which is a cipher that uses the same key to encrypt and decrypt a block, in this case. The cipher is not stored on the device in any form, encrypted or not, except in certain optional import/export scenarios when the latter are allowed by system policies. The cipher used preserves the block size, so the effective device capacity is preserved. While in principle any block cipher can be used, ciphers in accordance with the Advanced Encryption Standard (AES) are acceptable ciphers for use in the invention.

Figure 2A:
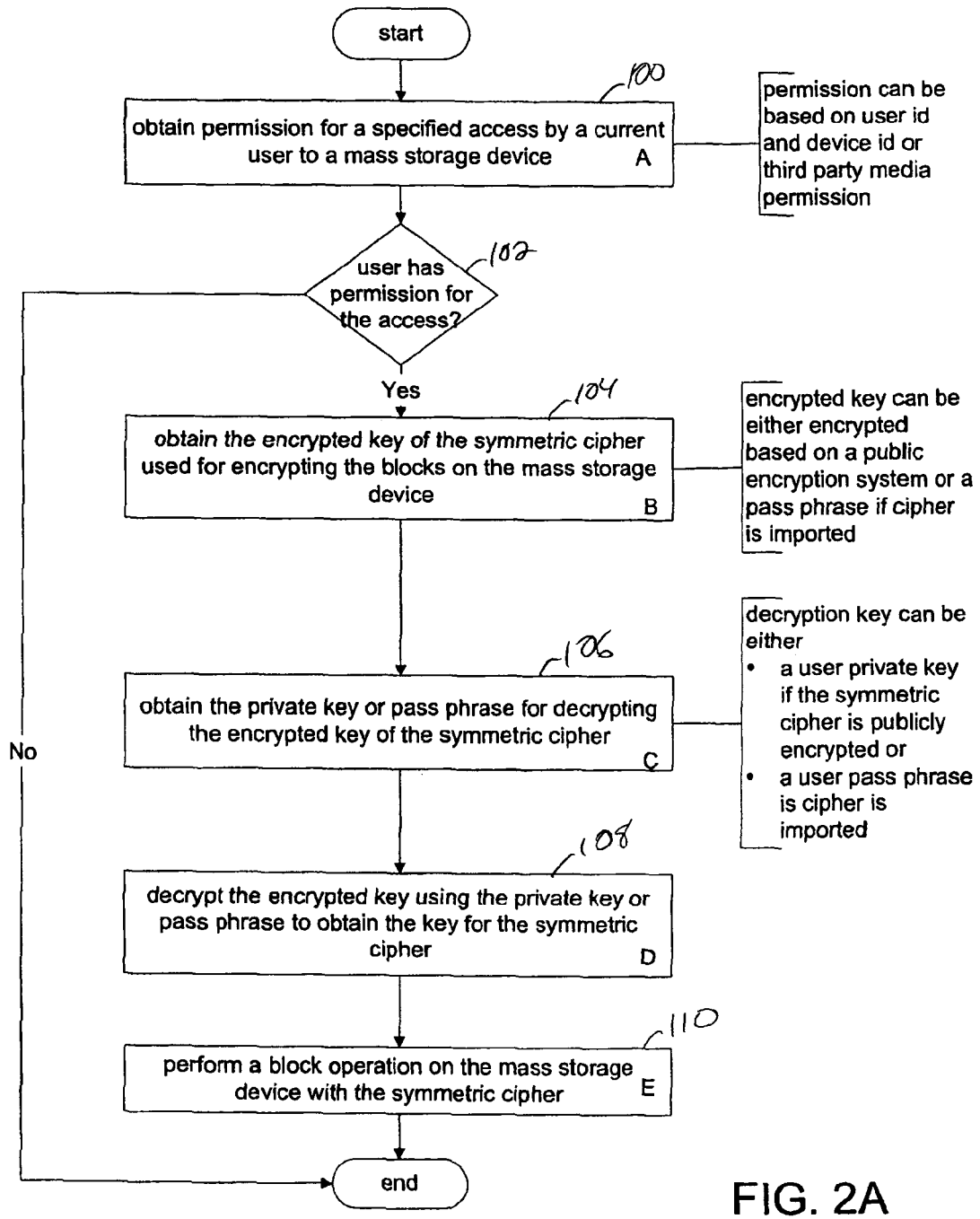
FIG. 2A illustrates an overall flow in accordance with one embodiment of the invention.
Figure 2B:
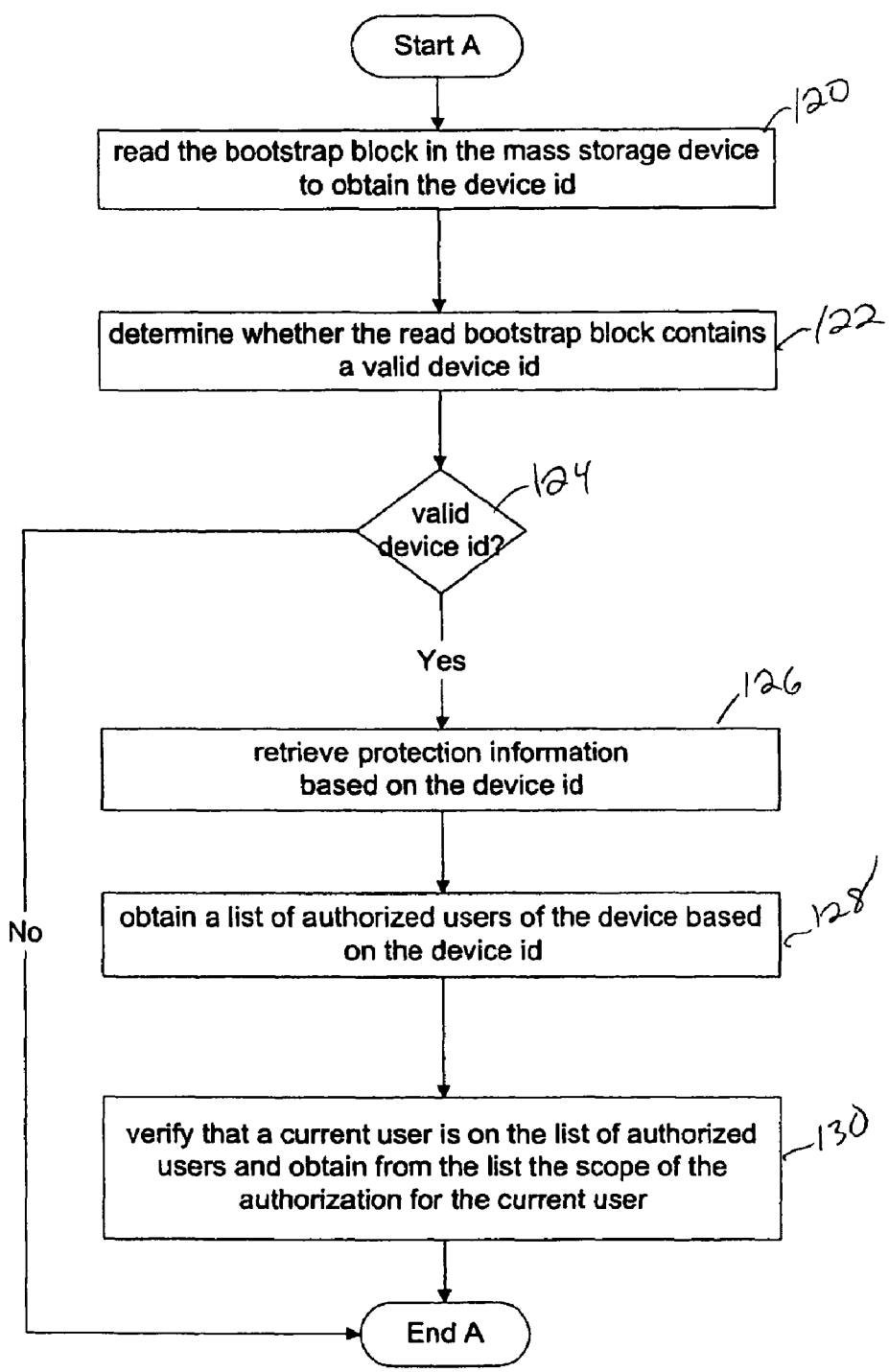
FIG. 2B illustrates an embodiment of step A of the flow chart in FIG. 2A.
Figure 2C:
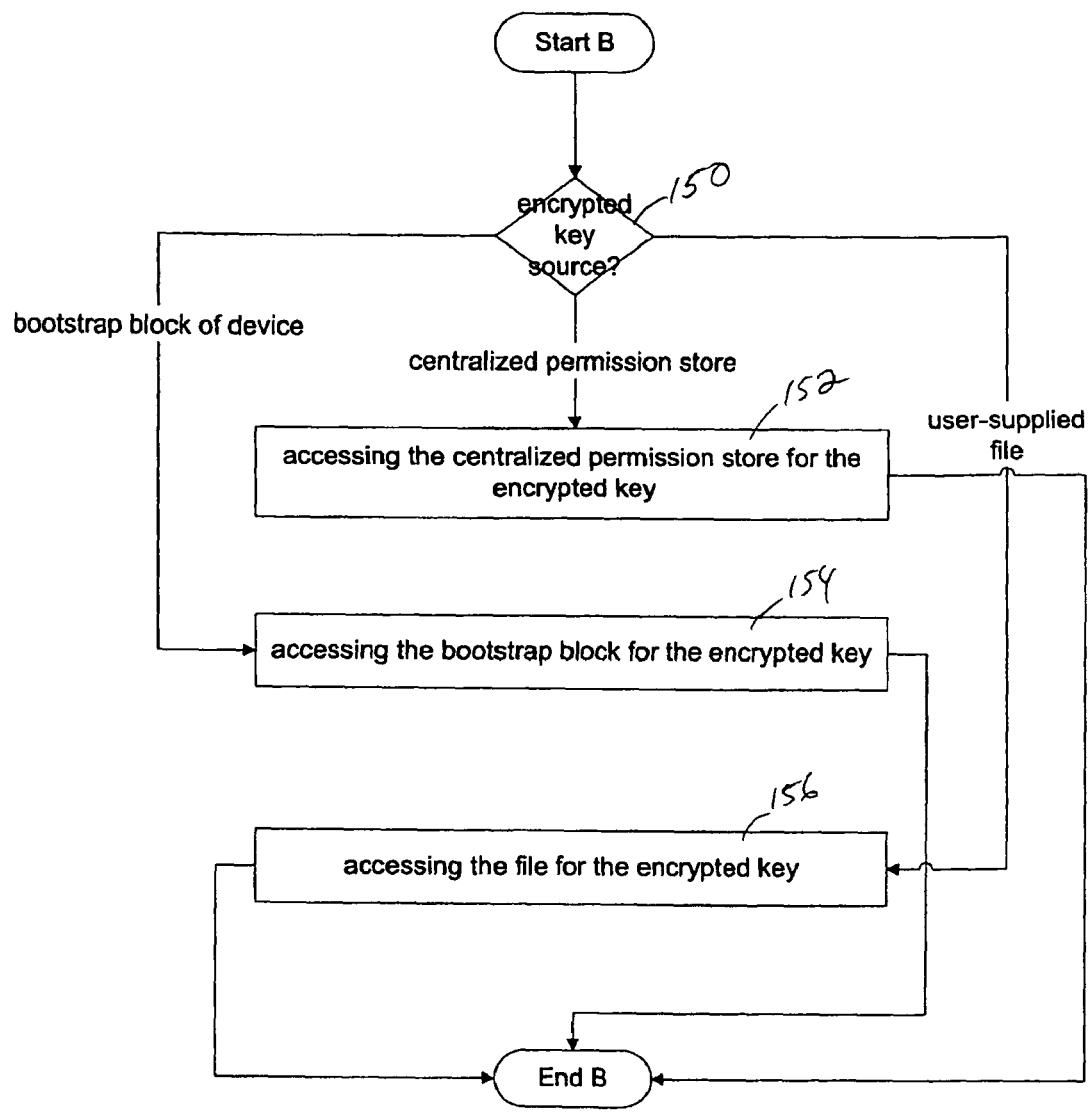
FIG. 2C illustrates an embodiment of step B of the flow chart in FIG. 2A.
Figure 2D:
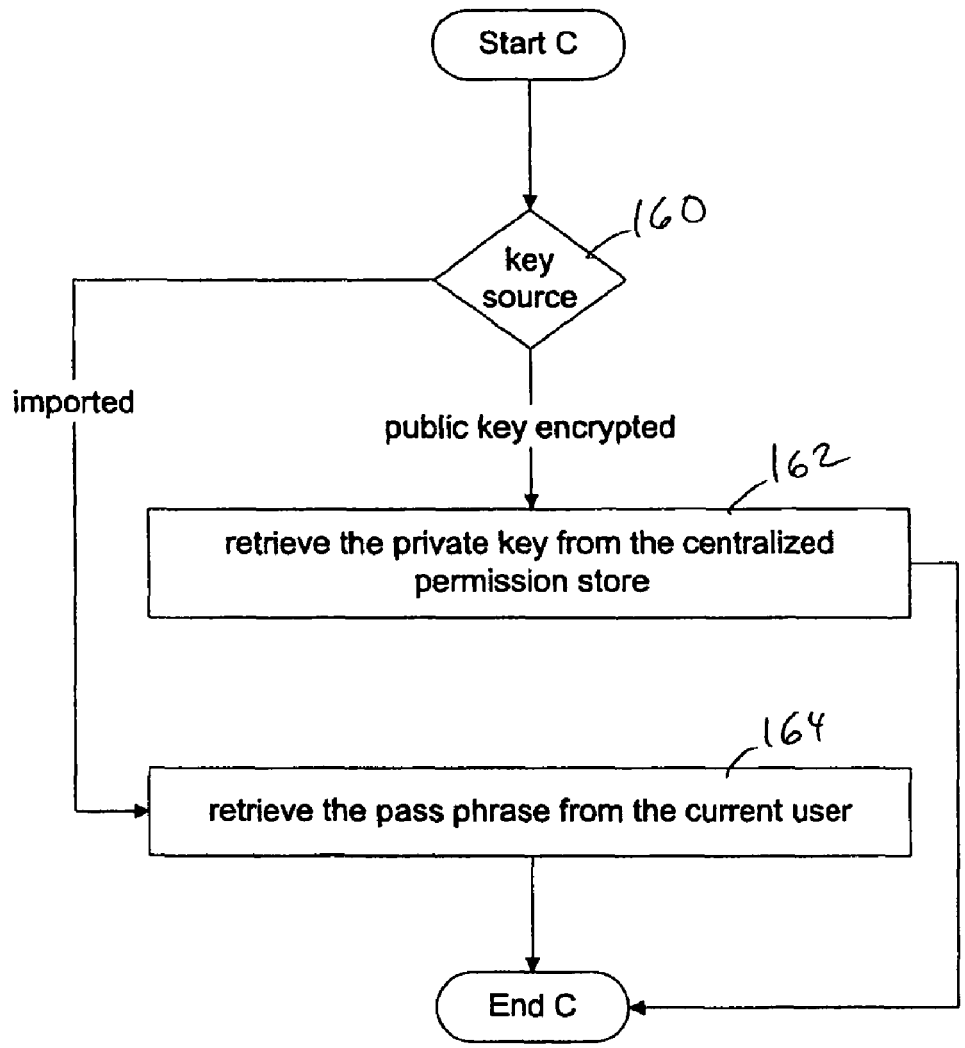
FIG. 2D illustrates an embodiment of step C of the flow chart in FIG. 2A.
Figure 2E:
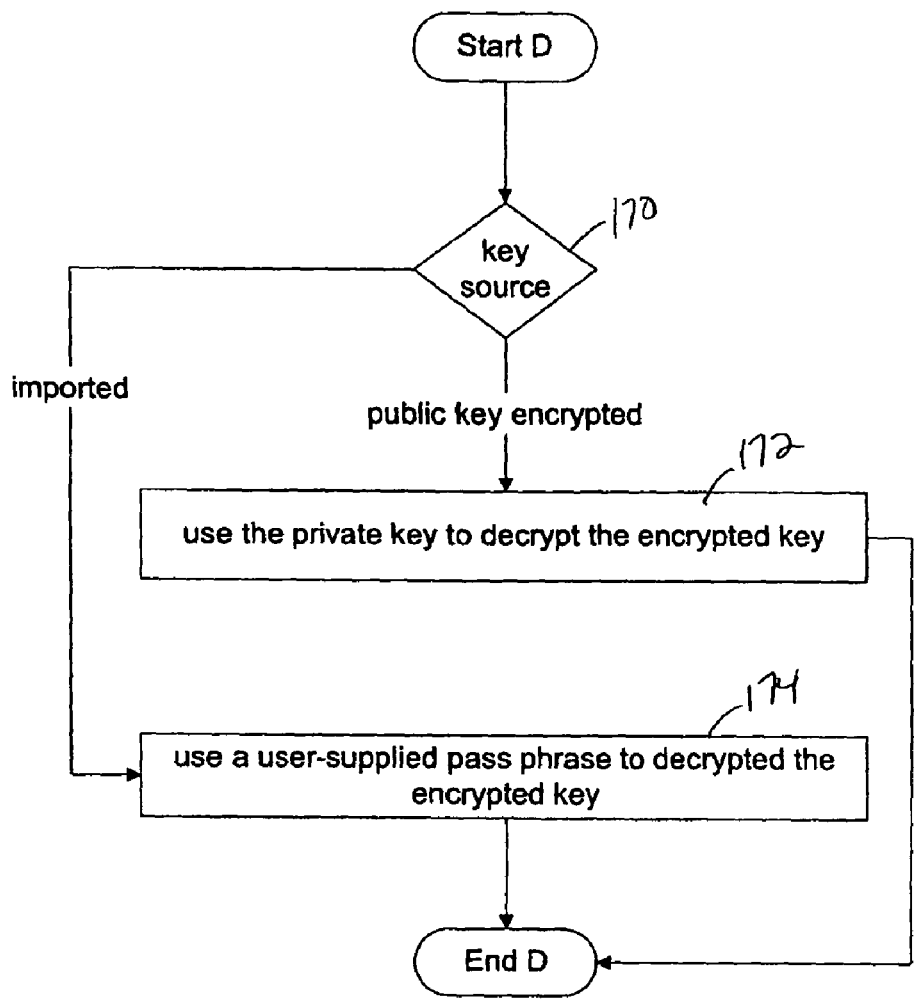
FIG. 2E illustrates an embodiment of step D of the flow chart in FIG. 2A.
Figure 2F:
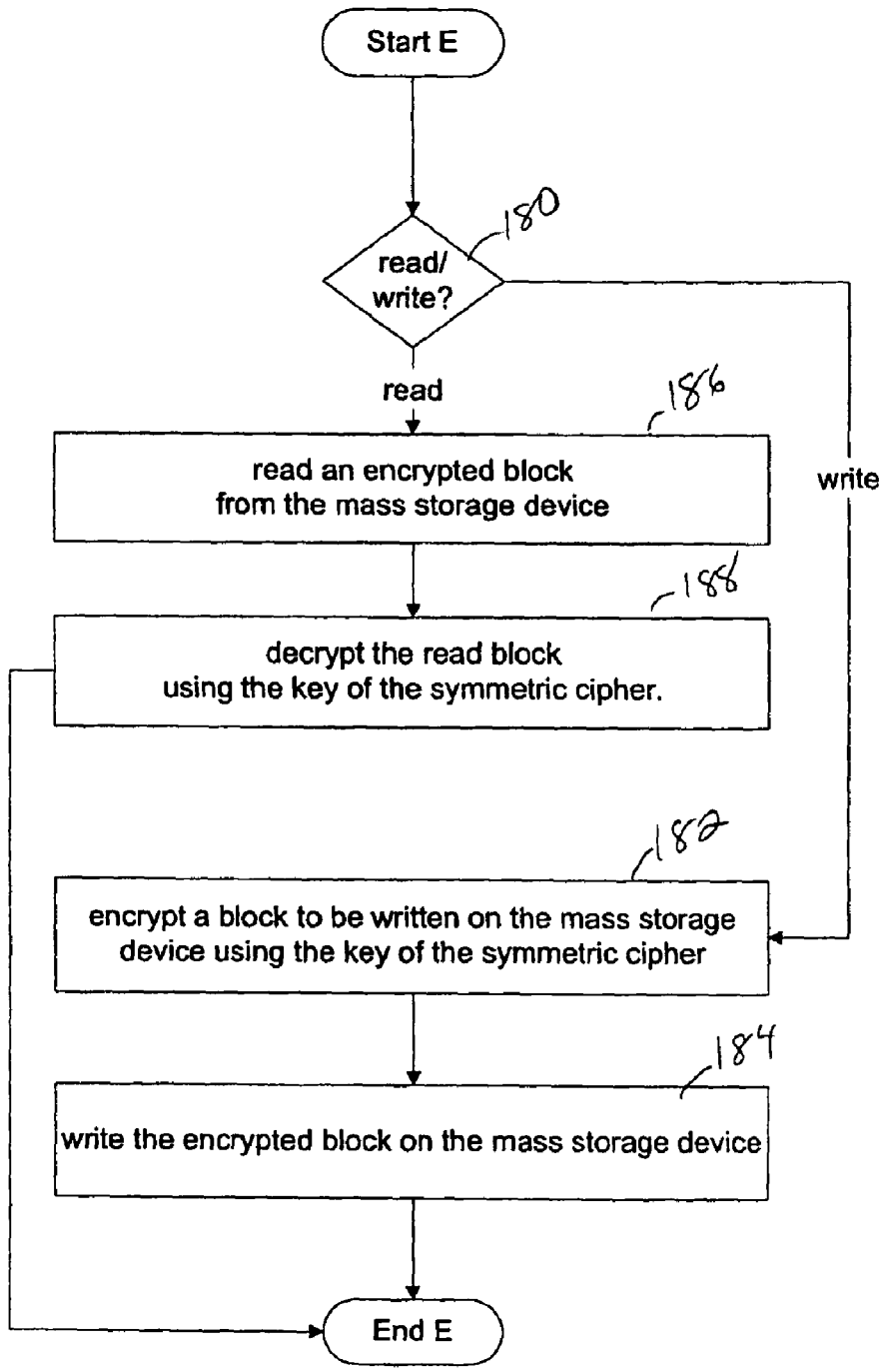
FIG. 2F illustrates an embodiment of step E of the flow chart in FIG. 2A.

A highly-privileged protection module is installed at the computers participating in the protection scheme. The flow chart of FIG. 2A gives an overall view of the process. In step 100, permission for a specified access by a current user to a mass storage device is obtained. Permission is based on a user id and either a device id or third party media permission. If the current user has permission to perform the specified access, as determined in step 102, the encrypted key of the symmetric cipher used for encrypting the blocks of the mass storage device is obtained, in step 104. The encrypted key can be encrypted based on a public encryption system or a pass phrase if the cipher is imported. Next, the private key (if the cipher key is publicly encrypted) or the user's pass phrase (if the key is imported) is obtained, in step 106. The private key or the pass phrase is used to decrypt the key of the symmetric cipher, in step 108. Finally, a block operation on the mass storage device is performed using the symmetric cipher.

In more detail, and referring to FIGS. 2B-2F, the protection module extends the system-supplied block-level device access services as follows:

a. When a device is detected in the system, the bootstrap block is read, in step 120. If it does not contain valid device identification information as determined in steps 122 and 124 of FIG. 2B, the device block access logic is not modified any way.

b. Otherwise, the protection module contacts a designated device permission store (or a local cache if the former is not available) and retrieves protection information by the device identifier, in step 126. The device protection information includes a series of device access permissions for each user authorized to access the device, which is checked in steps 128 and 130; for each such user it includes the symmetric cipher key of the device encrypted with a public key (or keys) of the user.

c. The protection module denies access to the device until the symmetric key is decrypted with a private key of a user specified in the protection information or until a user, allowed to import encryption keys, communicates the symmetric key. The encrypted key for the symmetric cipher is obtained, in step 152, from the centralized permission store. The private key is retrieved by a helper module running in the context of the user, in step 162, and is communicated to the protection module which decrypts, in step 172, the symmetric key (this step is not necessary if the protection module may retrieve the private keys directly, which is not always possible). In the case of importing a symmetric key, if the symmetric key is stored in a file, it may be communicated via the helper module in step 156. If the imported symmetric key is stored in a bootstrap block, the helper module requests that the protection module read the key from the bootstrap block, in step 154. In both cases, the user needs to supply to the helper module, in step 164, the pass phrase that protects the symmetric key. The helper module then forwards the pass phrase to the protection module, which then decrypts the symmetric key, in step 174, and uses it for data encryption.

Figure 3:
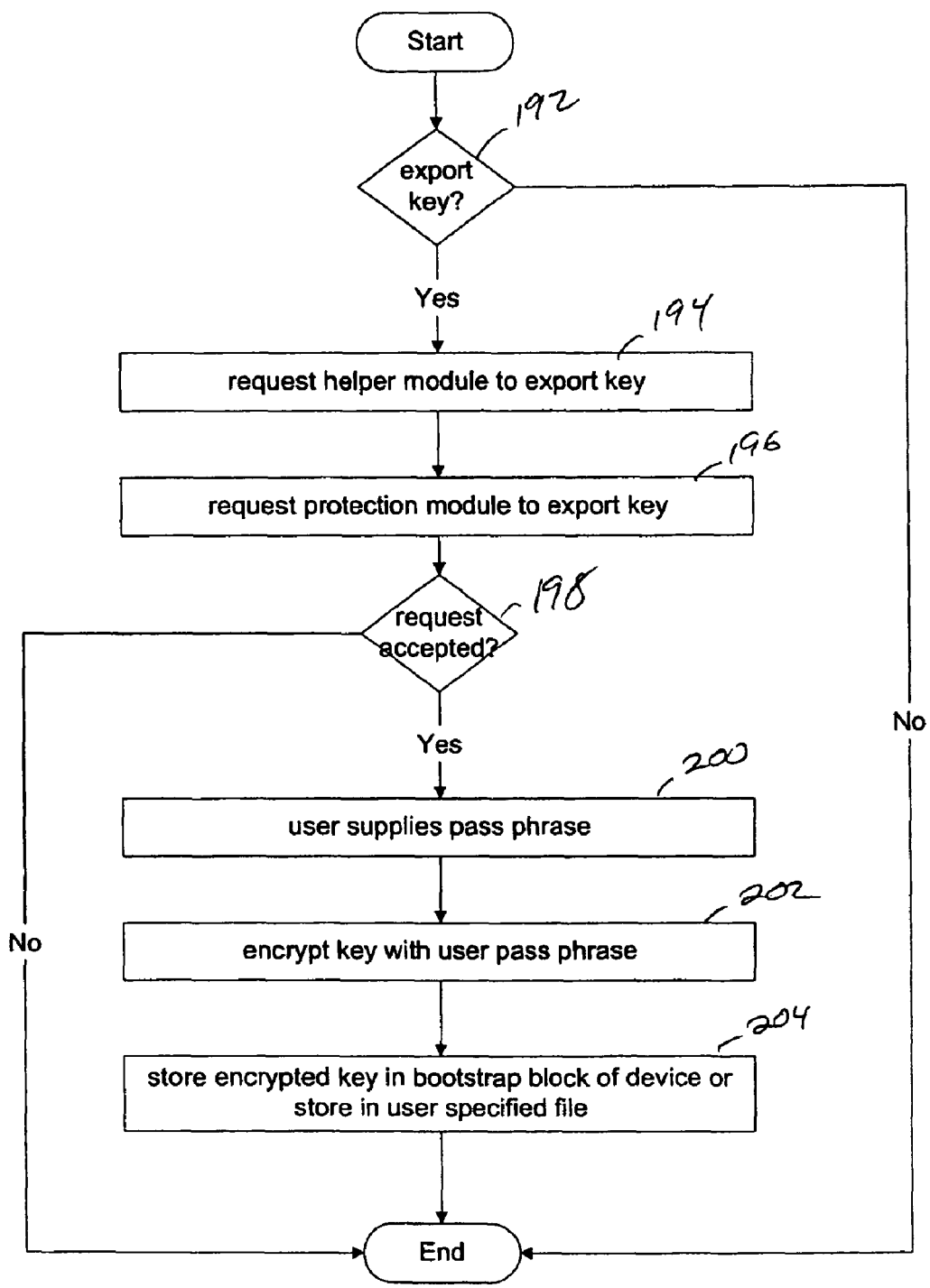
FIG. 3 illustrates the steps, in one embodiment, of exporting a key.

In the case of exporting a key as determined in step 192, the user may request the helper module, in step 194, of FIG. 3, which in turn makes a request to the protection module in step 196, to export the symmetric key. Depending on system policy, the protection module accepts or rejects this request, as determined in step 198. If accepted, The user supplies a pass-phrase in step 200, which is used to encrypt the symmetric key, in step 202 (the pass phrase strength is governed by system policy). If the export was requested to go to the bootstrap block, the protection client stores the encrypted symmetric key in the bootstrap block in step 204. Otherwise, it returns the encrypted key to the helper module, which stores it as requested by the user, in step 204.

d. The protection module denies access to the device to any user not specified in the protection information; for the users specified in the protection information, it restricts access to the level specified in the protection information. If the user imports a symmetric key, the device id is unknown preventing the user from using this device. In this case, special "third party media" permissions are consulted by the protection module to determine whether the user may read or write the device.

e. If write access is attempted and allowed as determined in step 180, the protection module encrypts the block being written with the symmetric key of the device, in step 182 and forwards the encrypted block to the original system-supplied block-write service, in step 184.

f. If read access is attempted and allowed, as determined in step 180, the protection module requests the original system-supplied block-read service to read the block originally requested by the user, in step 186, and then decrypts the block with the symmetric key of the device, in step 188.

Management of user private-public key pairs is beyond the scope of the invention. The invention, however, relies on the system-supplied service to enumerate the public key of the users of an organization in order to authorize certain users to access a device; it also relies on the system-supplied service to retrieve the private keys of a user by a helper module (in the security context of the user).

The symmetric encryption keys of the protected devices are stored at a highly secure location. They are never communicated in clear text.

Although the present invention has been described in considerable detail with reference to certain preferred versions thereof, other versions are possible. Therefore, the spirit and scope of the appended claims should not be limited to the description of the preferred versions contained herein.

What is claimed is:

1. A system configured to secure data comprising:
   (A) a centralized device permission store in a computer memory configured to store:
      (i) a device identifier associated with a previously-registered mass storage device;
      (ii) a list of users authorized to use the previously-registered mass storage device; and
      (iii) a first publicly encrypted symmetric key of a first symmetric cipher associated with the previously-registered mass storage device;
   (B) a helper module in operative communication with the centralized device permission store, wherein the helper module is configured to:
      (i) receive the first publicly encrypted symmetric key from the centralized device permission store;
      (ii) obtain a second private key of a first user contained on the list of users, wherein the second private key is configured to decrypt the first publicly encrypted symmetric key;
      (iii) receive from an unregistered mass storage device an imported encrypted symmetric key of a second symmetric cipher that is different from the first symmetric cipher;
         (1) wherein the imported encrypted symmetric key is encrypted by a pass phrase; and
      (iv) receive the pass phrase from a second user associated with the unregistered mass storage device; and
   (C) a protection module in operative communication with the centralized device permission store and with the helper module, wherein the protection module is configured to:
      (i) intercept a first block to be written to the previously-registered mass storage device, and encrypt the first block using the first symmetric cipher, wherein the first symmetric cipher preserves the size of data blocks on the previously-registered mass storage device;
      (ii) intercept a second block read from the previously-registered mass storage device, and decrypt the second block using the first symmetric cipher, wherein the first symmetric cipher preserves the size of data blocks on the previously-registered mass storage device;
      (iii) intercept a third block to be written to the unregistered mass storage device, and encrypt the third block using the second symmetric cipher, wherein the second symmetric cipher preserves the size of data blocks on the unregistered mass storage device; and
      (iv) intercept a fourth block read from the unregistered mass storage device, and decrypt the fourth block using the second symmetric cipher, wherein the second symmetric cipher preserves the size of data blocks on the unregistered mass storage device.

2. A system as recited in claim 1, wherein the first publicly encrypted symmetric key is configured to encrypt and decrypt the first symmetric cipher.

3. A system as recited in claim 1, wherein the device identifier is stored on a bootstrap block of the previously-registered mass storage device.

4. A system as recited in claim 1, wherein the device identifier is stored in a first area of the previously-registered mass storage device reserved for a bootstrap block, and wherein the first area is in a protected partition of the bootstrap block.

5. A system as recited in claim 1, wherein the imported encrypted symmetric key is stored either in a file supplied by the second user or a bootstrap block of the unregistered mass storage device.

6. A system as recited in claim 5, wherein the protection module is configured to read the imported encrypted symmetric key from the bootstrap block.

7. A system as recited in claim 1, wherein the centralized device permission store includes a list of third party users who can authorize other users to access the previously-registered mass storage device.

8. A system as recited in claim 1, wherein the first and second symmetric ciphers are block ciphers.

9. A system as recited in claim 1, wherein the first and second symmetric ciphers are AES ciphers.

10. A system as recited in claim 1, wherein the protection module is configured to allow access to the previously-registered mass storage device only after the first publicly encrypted symmetric key is decrypted by the second private key.

11. A system as recited in claim 1, wherein the protection module is configured to retrieve protection information associated with the device identifier when the device identifier is detected.

12. A system as recited in claim 1, wherein the protection module is configured to deny user access to the previously-registered mass storage device if the first user is not specified in the list of users.

13. A system as recited in claim 1, wherein the protection module is configured to decrypt the first publicly encrypted symmetric key.

* * * * *